US008412729B2

(12) United States Patent
Sims et al.

(10) Patent No.: US 8,412,729 B2
(45) Date of Patent: Apr. 2, 2013

(54) SHARING OF PRESETS FOR VISUAL EFFECTS OR OTHER COMPUTER-IMPLEMENTED EFFECTS

(75) Inventors: Karl P. Sims, Cambridge, MA (US); Gary C. Oberbrunner, Somerville, MA (US); Katherine Hays, Boston, MA (US)

(73) Assignee: GenArts, Inc., Cambridge, MA (US)

( * ) Notice: Subject to any disclaimer, the term of this patent is extended or adjusted under 35 U.S.C. 154(b) by 456 days.

(21) Appl. No.: 12/765,541

(22) Filed: Apr. 22, 2010

(65) Prior Publication Data

US 2010/0274714 A1  Oct. 28, 2010

Related U.S. Application Data

(60) Provisional application No. 61/171,657, filed on Apr. 22, 2009.

(51) Int. Cl.
*G06F 17/30* (2006.01)
(52) U.S. Cl. .......... 707/769; 707/781
(58) Field of Classification Search ........... 707/758–788
See application file for complete search history.

(56) References Cited

U.S. PATENT DOCUMENTS

| | | | | |
|---|---|---|---|---|
| 2009/0082888 A1* | 3/2009 | Johansen | .......... | 700/94 |
| 2010/0257450 A1* | 10/2010 | Go et al. | .......... | 715/733 |
| 2011/0078109 A1* | 3/2011 | Griggs et al. | .......... | 707/609 |
| 2011/0093492 A1* | 4/2011 | Sull et al. | .......... | 707/769 |
| 2011/0270123 A1* | 11/2011 | Reiner | .......... | 600/558 |

OTHER PUBLICATIONS

DSWiki, "DS Presets," <http://dswiki.wikispaces.com/DS+Presets>, Internet accessed on Apr. 13, 2009, 2 pages.
IK Multimedia, "Messe '09: IK Launches New AmpilTube® Preset XChange," <http://www.ikmultimedia.com/NewsDisplay.php?Id+2013>, Internet accessed on Apr. 13, 2009, 2 pages.
Muchmore, M., "5 Free Online Video Editing Sites Reviewed," <http://www.extremetech.com/print_article2/0,1217,a%253D206582,00.asp>, May 2, 2007, 5 pages.

* cited by examiner

*Primary Examiner* — Wilson Lee
(74) *Attorney, Agent, or Firm* — Perkins Coie LLP

(57) ABSTRACT

This application describes a system and associated methods for enabling users of video editing, compositing, motion graphics, and other applications to easily store and retrieve presets, have presets modified for compatibility with other applications, share presets with each other, and search for shared presets. The users may utilize different applications that store presets according to different application-specific schemas. The system can automatically translate or conform presets from one application-specific schema to a neutral schema and from the neutral schema to another application-specific schema. This allows a user of one application to share his or her presets with users of different applications. Among other things, this cross-application sharing of presets allows the system implementor to create one user community (e.g., of users of different applications), rather than several individual ones (e.g., an individual user community for each different application). Other features of the system and associated methods are also described.

30 Claims, 8 Drawing Sheets

```xml
<plugin name="S_LensFlare">                      505
<metadata>
    <vendor>GenArts, Inc.</vendor>
    <product>Sapphire</product>
    <version>2.01</version>
    <host>AE</host>
    <hostversion>8</hostversion>
    <pixel_aspect>1.111</pixel_aspect>
    <timestamp>2009-03-25 11:00:00 EST</timestamp>
    <userdata>
        <user>Gary Oberbrunner</user>
        <project>GenArts Demo</project>
        <company>GenArts, Inc.</company>
    </userdata>
</metadata>
<inputs>
    <input><name>
Source</name><dims><xdim>720</xdim><ydim>486</ydim></dims><depth>8</depth></input>
    <input><name>
Mask</name><dims><xdim>720</xdim><ydim>486</ydim></dims><depth>8</depth></input>
</inputs>
<thumbnail>
    KCEeFztbUCgrPTxCDRkFRKXPqfbx2sDRz6Wm8p+Ji4uGoERvfl ItUl5oaCM7lD83
    FwkyP4vbzsbN7OLg/J+Lh5aZrbm0p7tPXy47HkdfQx42KSdka2JSS0C5tq+knZqO
    +dWgr7+rusalmplte312akxDXRp86XJrYFlWT0SK4frxpoOdu8zavquy4cLe+oKK
</thumbnail>
<params>
<param name="width" type="float"><value type="float">10</value></param>
<param name="hotspot" type="float">
    <channels>
        <channel><value>200</value></channel>
        <channel><value>300</value>
            <keyframes>
            <keyframe interpolation="spline">
                <time unit="sec">0.0</time><value>201</value>
            </keyframe>
            <keyframe interpolation="linear">
                <time unit="sec">1.0</time><value>500</value>
            </keyframe>
            </keyframes>
        </channel>
    </channels>
</param>
</params>
</plugin>
```

*FIG. 5*

SHARING OF PRESETS FOR VISUAL EFFECTS OR OTHER COMPUTER-IMPLEMENTED EFFECTS

CROSS-REFERENCE TO RELATED APPLICATION

This application claims the priority of U.S. Provisional Application No. 61/171,657, filed on Apr. 22, 2009 the entirety of which is hereby incorporated by reference.

BACKGROUND

Applications for generating visual effects, such as video editing, compositing, and motion graphics applications, may use plug-ins to produce certain effects. For example, GenArts Inc., of Cambridge, Mass., provides plug-ins packages for several different applications for generating visual effects (called host applications). Some examples of host applications that GenArts plug-ins can be used with are: Adobe After Effects, Apple Final Cut Pro, Avid Media Composer, and Autodesk Flame. GenArts plug-ins are available in different versions depending on which host application they are compatible with.

Visual effects plug-ins can usually generate a multitude of possible results depending on how a user of the host application sets parameter values and options within that plug-in. This flexibility gives users an open-ended toolbox of new looks. Once a specific combination of parameter values has been found, the user can instruct the host application to save that combination as a "preset" on the user's computer. The user can load the preset again later and apply it to different film or video clips to achieve similar looks again.

Although plug-ins are generally provided for several different host applications, plug-in presets for different host applications are typically not compatible with each other because they are in different host application-specific formats.

BRIEF DESCRIPTION OF THE DRAWINGS

FIG. 5 is an example plug-in preset in an XML format.

DETAILED DESCRIPTION

Figure 1:
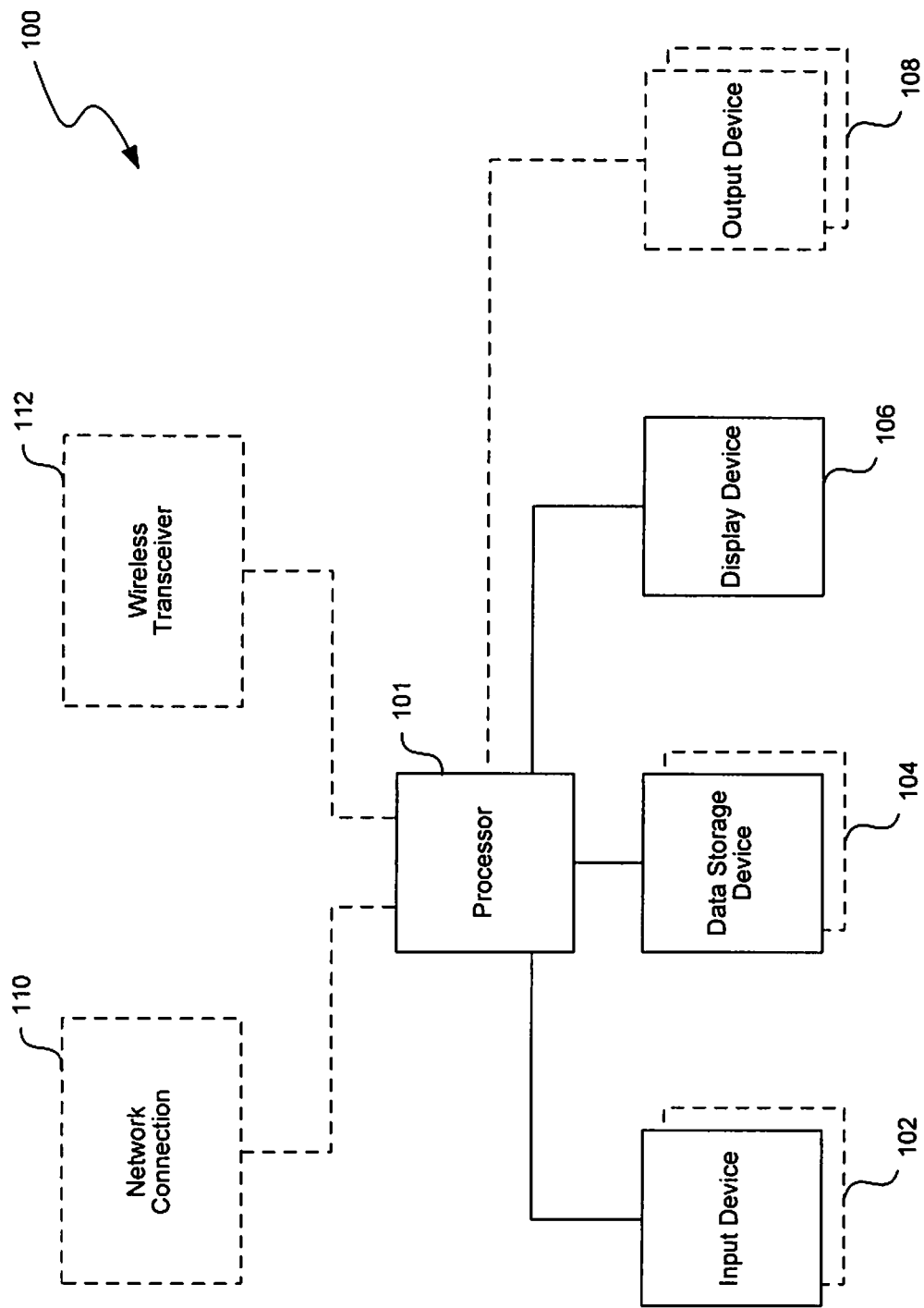
FIG. 1 is a block diagram of a computer that may employ aspects of the invention.

The headings provided herein are for convenience only and do not necessarily affect the scope or meaning of the claimed invention.

Overview

The inventors have recognized the need for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art.

This application describes systems (a "system") and associated methods for enabling users of host applications and plug-ins and/or stand-alone applications to easily store and retrieve their presets, have them translated into other forms including those that can be used across different host platforms, share their presets with each other and with other users, and search for shared presets, via a web portal. The web portal may be a publicly available web site on the Internet, a private website on a private network (e.g., an organization's intranet), or some combination of the two. An implementor of the system can create a community of users who benefit from the ability to easily store, retrieve, and share their visual effects work with each other. Such sharing amongst the community of users is possible even though the users may utilize normally-incompatible presets.

A preset includes data usable by an application to generate visual effects for moving (e.g., digital video) or still images (e.g., digital images). Such data can include parameters and associated parameter values, input requirements (for example, video/image source and/or mask information), and/or other data identifiers and associated data values. The data can also include data corresponding to an image, a video, and/or other digital asset to which the preset has been applied or can be applied. A preset can also include descriptive metadata.

The users may use a variety of different host applications for generating visual effects that normally store plug-in presets in host application-specific formats. Additionally or alternatively, the users may use stand-alone applications for generating visual effects that do not require the use of plug-ins, but instead generate visual effects natively (without plug-ins). For example, web applications, video game applications, embedded (e.g., in mobile devices) applications, and/or other stand-alone applications could provide effects generation natively, without requiring use of plug-ins to produce visual effects. In such cases, the data used by stand-alone applications to produce video effects may simply be referred to as presets. The phrase application, as used herein, is intended to include both applications that use plug-ins to produce visual effects (host applications) and applications that can produce visual effects without the use of plug-ins (stand-alone applications). Applications may be dedicated to generating effects (e.g., special-purpose video editing, compositing, and motion graphics applications). Alternatively, applications may not be dedicated to generating effects, but may include, in addition to other capabilities, the ability to generate effects (e.g., perform video editing, compositing and/or motion graphics functions).

The system augments the application preset storage mechanism with methods for saving the presets in a network-accessible location such that the presets are accessible to multiple users. The system can automatically translate or conform preset data from one application-specific schema to a neutral schema, and from the neutral schema to another schema specific to one or more other applications. This automatic translation enables a user of one application for generating visual effects to share his or her presets with users of different applications for generating visual effects. Among other things, this cross-application sharing of presets allows the system implementor to create one user community (e.g., of users of different applications for generating visual effects), rather than several individual ones (e.g., an individual user community for each different application for generating visual effects).

The user community may be generally divided into two groups: a first group of users with access to host applications and associated plug-ins and/or stand-alone applications, and a second group of users without access to such applications. For example, the first group may include professional users (e.g., those users who perform video editing on a professional or semi-professional basis, such as special effects artists using existing host applications, future host applications, and/or stand-alone applications). Professional users generally have access to their own host applications for generating visual effects and/or stand-alone applications for generating visual effects. The second group may include consumer users (e.g., those users who occasionally perform video editing, such as home users or hobbyists, and/or users with consumer-grade hardware and/or software such as video camcorders or mobile phones). Consumer users may or may not have access to host applications for generating visual effects and/or stand-alone applications for generating visual effects.

In some cases, the system may provide a set of features to the first group of users (e.g., professional users), and a subset of those features to the second group of users (e.g., consumer users). For example, the system may allow only the first group of users to create and save presets. The system may not allow the second group of users to created and saved by the first group of users. Alternately, the system may provide the same features to both groups of users.

The preceding example of professional and consumer users, and how each group may interact differently with the system, is used throughout this application. However, those of skill in the art will understand that different types of users may interact with the system. Furthermore, those of skill in the art will understand that the differences between professional users and consumer users may not necessarily be meaningful distinctions in comprehending how the system can interact with different users. Rather, a meaningful distinction is that between those users with access to host applications and associated plug-ins and/or stand-alone applications (examples of which are generally professional users) and those without such access (examples of which are generally consumer users). Therefore, the system and associated methods are not limited to just these two groups of users and how the users of each group may interact with the system.

The system also facilitates deriving revenue from the sharing of presets and effects created from presets. For example, users can post presets to the web portal that are for sale and/or available for licensing. As another example, an organization (e.g., a production studio) can provide a library of presets that the organization has used to create video effects for a specific video production (e.g., a television show, a movie, etc.). Accordingly, the system facilitates an online marketplace where users can offer presets for purchase and/or license and users can purchase and/or license presets.

Various embodiments of aspects of the invention will now be described. The following description provides specific details for a thorough understanding and enabling description of these embodiments. One skilled in the art will understand, however, that aspects of the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of aspects of the invention. Certain terms may even be emphasized below; however, any terminology intended to be interpreted in any restricted manner will be overtly and specifically defined as such in this Detailed Description section.

Suitable Computing Environments

FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that aspects of the invention can be practiced with other computer system configurations, including Internet appliances, hand-held devices, wearable computers, cellular or mobile phones, video recorders, cameras, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor or any device capable of communicating with a network, including consumer electronic goods such as game devices, cameras, or other electronic devices having a processor and other components, e.g., network communication circuitry.

Aspects of the invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of aspects of the invention may reside on a server computer, while corresponding portions reside on a client computer. Data structures and transmission of data particular to aspects of the invention are also encompassed within the scope of the invention.

Referring to FIG. 1, one embodiment of aspects of the invention employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 1).

Figure 2:
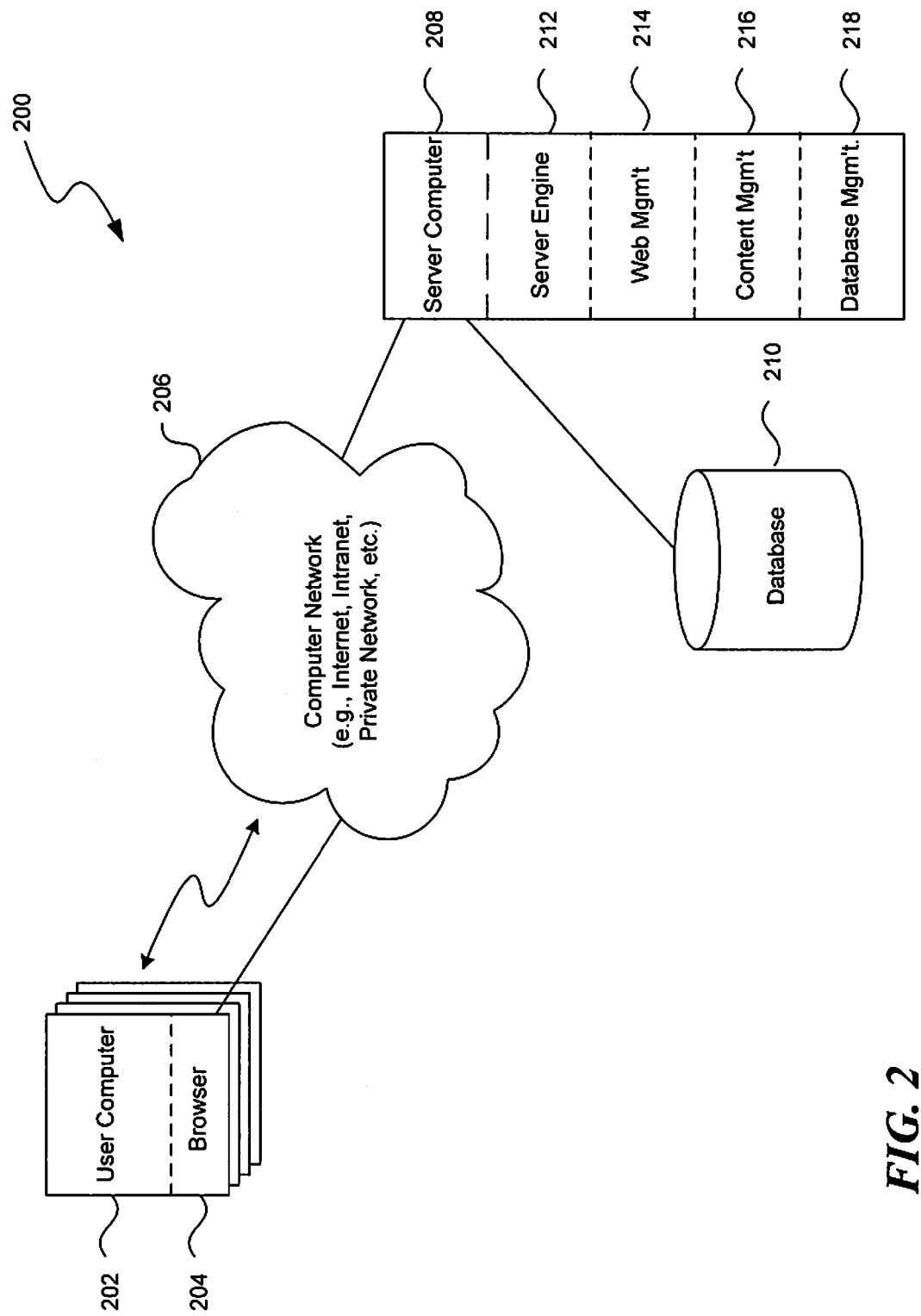
FIG. 2 is a block diagram illustrating a suitable system in which aspects of the invention may operate in a networked computer environment.

Aspects of the invention may be practiced in a variety of other computing environments. For example, referring to FIG. 2, a distributed computing environment with a web interface includes one or more user computers 202 in a system 200, each of which includes a browser program module 204 that permits the computer to access and exchange data with the computer network 206, including web sites within the World Wide Web portion of the Internet, within an intranet, and/or within other public and/or private networks. For example, an organization (e.g., a production studio) may use the system 200 in a private, non-public, environment, such as a private intranet not having any connections to the public Internet. Organizations (e.g., production studios) may utilize such a private system 200 to safeguard proprietary information (e.g., movies in various stages of production) and prevent release of such information to the general public. The user computers 202 may be substantially similar to the computer described above with respect to FIG. 1. User computers may include other program modules such as an operating system, one or more video editing, compositing and/or motion graphics applications, one or more application programs (e.g., word processing or spread sheet applications), and the like. The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail herein; the use of a web browser and web interface are only used as a familiar example here.

At least one server computer 208, coupled to the computer network 206, performs much or all of the functions for receiving, routing and storing of electronic messages, such as machine-readable data, web pages, audio signals, and electronic images. While the Internet is described in some examples herein, a private network, such as an intranet, may indeed be used in some applications. The network may have a client-server architecture, in which a computer is dedicated to serving other client computers, or it may have other architectures such as a peer-to-peer, in which one or more computers serve simultaneously as servers and clients. A data store (shown as a single database 210; the data store may also include multiple databases), coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, Secure Socket Layers (SSL), password protection schemes, encryption, and the like).

The server computer 208 may include a server engine 212, a web page management component 214, a content management component 216 and a database management component 218. The server engine 212 performs basic processing and operating system level tasks. The web page management component 214 handles creation and display or routing of web pages. Users may access the server computer 208 by means of a URL associated therewith. The content management component 216 handles most of the functions in the embodiments described herein. The database management component 218 includes storage and retrieval tasks with respect to the database, queries to the database 210, and storage of data.

In some embodiments of the invention, the server computer 208 may in fact be the same computer as the user computer 202, with one or more processes or libraries on the user computer 202 embodying the services and tasks described above which are usually provided by the server computer 208. In these cases a separate server computer 208 may not be required.

System Interaction for Users with Applications and Users without Applications

Figure 3:
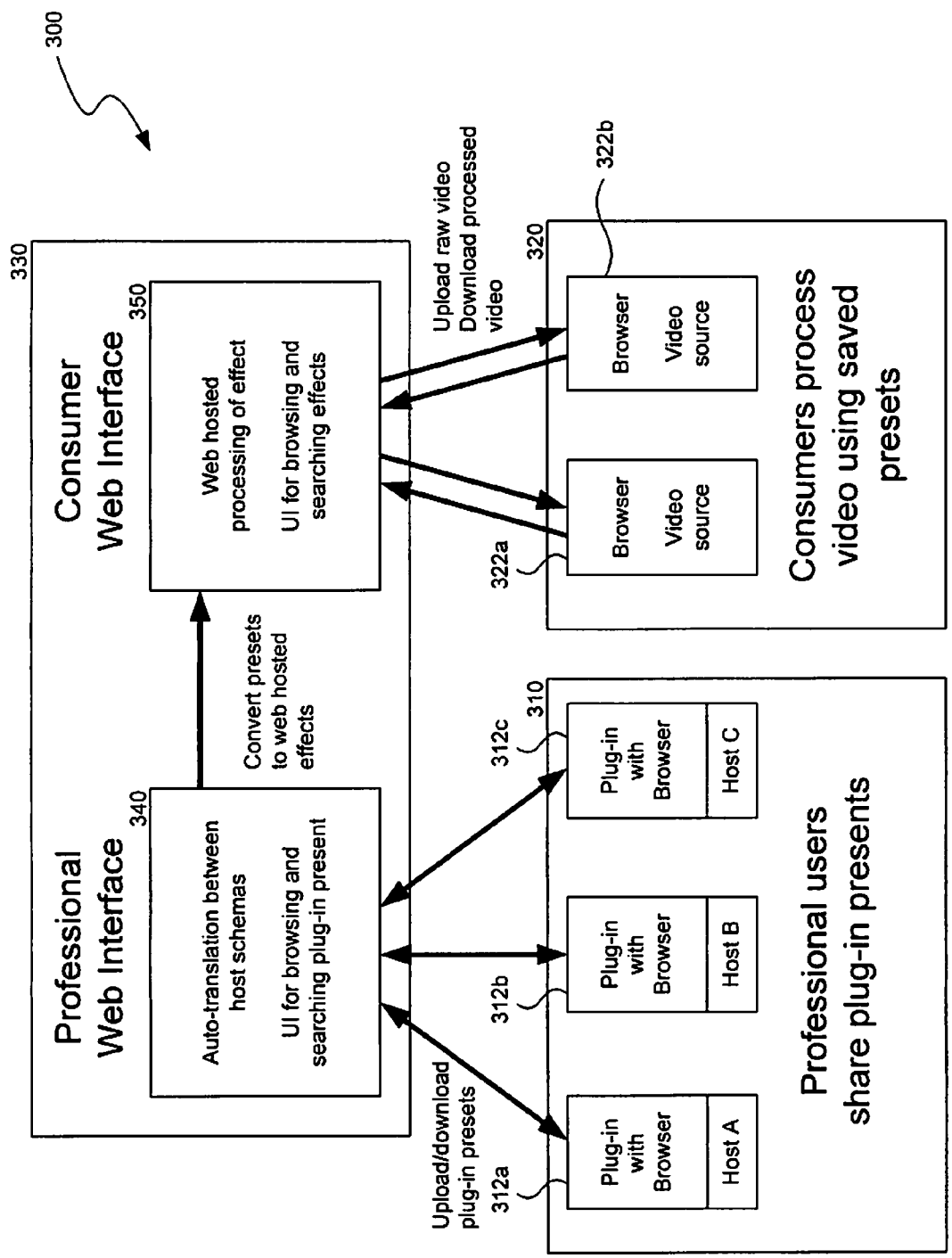
FIG. 3 is a block diagram illustrating how two different groups of users (e.g., professional users and consumer users) can interact with aspects of the invention.

FIG. 3 is a block diagram 300 illustrating how two different groups of users—a first group of users with access to host applications and associated plug-ins and/or stand-alone applications, and a second group of users without access to such applications—can interact with the system. A user in the first group can create presets using his or her host application and plug-ins and/or stand-alone application, share them with the system, and use presets created by other users in the first group. A user in the second group generally does not create and/or share presets. Rather, such a user generally only uses presets created by users in the first group. Users in the second group typically cannot modify created presets, although the system may provide some limited customization capabilities to such users, for instance allowing them to choose the amount or brightness of an effect to be applied, or to choose among closely related or slightly modified versions of one or more presets. Professional users are used as an example of the first group of users, and consumer users are used as an example of the second group. As noted before, however, the system distinguishes between those users with access to host applications and associated plug-ins and/or stand-alone applications, and those without such access, not necessarily between professionals and consumers. Accordingly, the aspects of the system described with reference to FIG. 3 are not limited to just these two types of users.

As depicted in FIG. 3, several professional users 312a, 312b, and 312c may comprise a group 310 of professional users. At least some of the professional users 312 may be affiliated with each other (such as individuals working for a single special effects studio), or the professional users 312 may not share any affiliation. Each of the professional users 312 may use a different host application or stand-alone application for video editing (indicated by Host A, Host B, Host C, respectively). The professional users 312 create presets (e.g., presets for plug-ins for host applications) and upload them to a web server 330 that provides a specific web interface 340 for the professionals. The professional web interface 340 allows for browsing, editing, searching for presets, bidding on presets, and/or other features. The web server 330 also automatically translates presets between different host application schemas (this translation is described in more detail with reference to, e.g., FIGS. 4 and 6). The web server 330 also contains a social networking component which may include discussion forums, messaging, voting and ranking, notifications, tagging, comments, moderation, video markup, and/or other features.

An additional benefit of the collection of presets saved by professionals is that they can be converted into stand-alone effects and offered to consumers for web-hosted processing of uploaded video material. The web server 330 converts presets saved by professional users 312 to effects that consumer users 322 can apply. For example, a consumer may use a stand-alone application such as a web application, a video application, and/or an application provided by a mobile device (e.g., mobile phone, digital camera, etc.) to apply effects to video. The consumer users 322 (shown individually as consumer users 322a and 322b) interact with the system using a consumer web interface 350 provided by the web server 330. Consumer users 322 may comprise a group 320 (e.g., a group of friends or acquaintances). The consumer web interface 345 allows consumer users 322 to browse and search for effects. Therefore, a consumer user 322 without a host application or plug-in or stand-alone application can still browse available effects using the consumer web interface 350. The consumer web interface 350 includes the searching and social networking features provided by the professional web interface 340. Web hosted processing of video using shared effects is described in more detail with reference to, e.g., FIG. 8.

Sharing Presets

As described herein, the system can provide a web portal that enables users to easily store and retrieve their presets, have them translated into or conformed to other schemas, share their presets with each other and with other users, and search for shared presets. Presets for single plug-ins can be shared, and combinations of several plug-ins together with their specific connections and settings can also be shared as grouped presets. This allows more complex custom effects to also be provided to users. The system enables a user to create a library, or portfolio, of presets that the user can utilize for current and future projects. The system also enables a user to share presets in the user's library with other users. For example, a user may choose to share his or her plug-in presets with the general public (by, e.g., making them available on the Internet), with other users affiliated with an organization with which the user is associated (e.g., a production studio that produces movies, television shows, and/or other forms of video), and/or with users associated with a subset of the organization (e.g., a group of users within a production studio responsible for a single movie, or a single television series).

The presets can be shared by saving to and loading from the web server 330 that users have access to. For example, the web server 330 may provide a public website on the public Internet, a private website on a private network (e.g., an organization's intranet), or some combination of the two. When the presets are uploaded to the web server 330, they can be stored either as files (or other data objects) or in a database (e.g., the database 210), which can contain the preset data and associated metadata. The data store stores a collection of presets provided by multiple users and accessible to multiple users. Preset metadata can include information such as author, description, project, company, dates, popularity, comments, votes, tags, folders, cost if any, and security and availability information. The preset can be uploaded to the web server 330 along with an optional thumbnail image extracted from the current frame of the current video, or any other frame or sequence of frames of the user's choosing.

Figure 4:
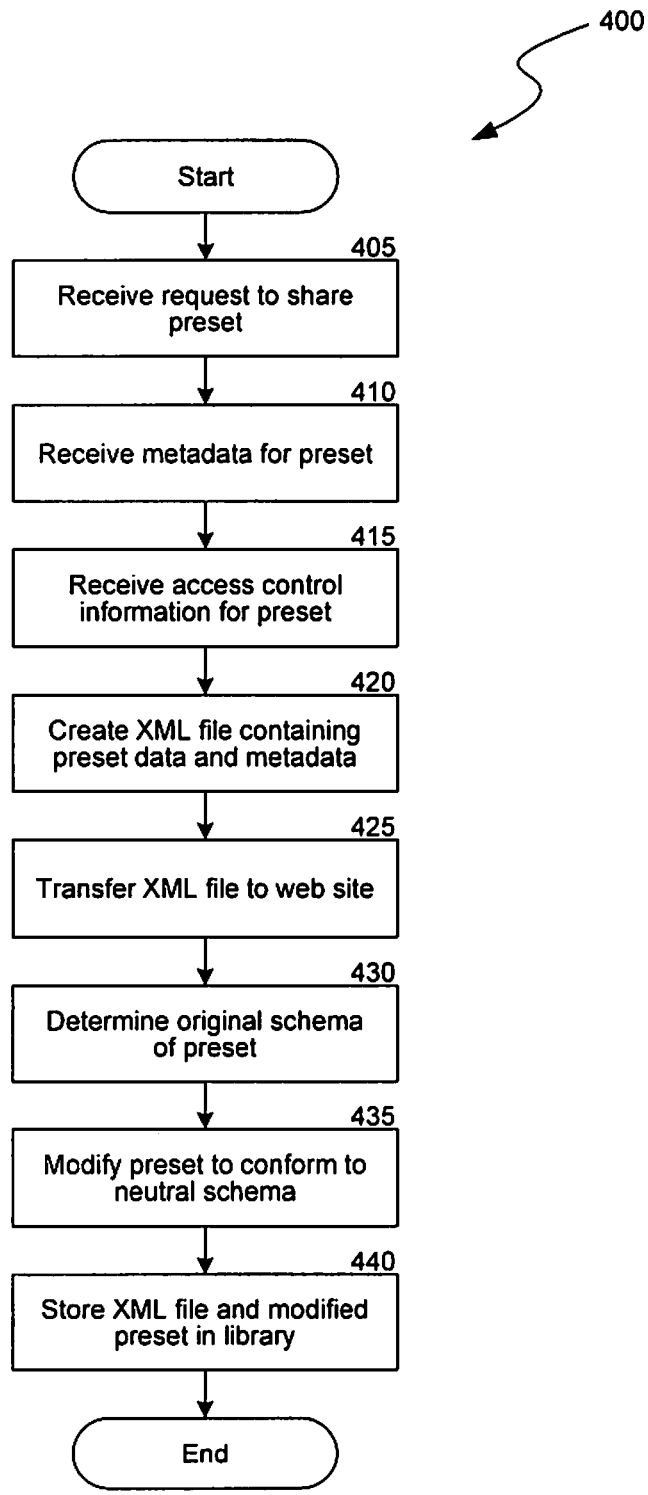
FIG. 4 is a flow diagram illustrating a process for sharing a preset.

FIG. 4 is a flow diagram illustrating a process 400 for sharing a preset. The process 400 begins at step 405, where a request to share a preset is received. For example, a video editing application (or other application) can receive a request from a user of the application to share the preset, by, e.g., saving the preset to the web server 330. The application can provide an interface that allows the preset author to provide information, such as a location on the web server 330 where the preset is to be stored, access control information for the preset, metadata for the preset, and/or other information. For example, a plug-in for a host video editing application can include a browser (e.g., a browser based on WebKit or other embeddable browser) to allow the user to upload or download presets while remaining within the plug-in user interface of the host application. The user could press a "Save Preset" button (or a "Manage Presets" button, and then a "Save" button), which could bring up the browser interface so that the user can select the appropriate options, such as author and project name, as well as a location on the web server 330 to save the preset to. A browser could also be included in stand-alone applications. Additionally or alternatively, the user could use a stand-alone browser (e.g., a Microsoft Internet Explorer, Mozilla Firefox, Google Chrome, Apple Safari, etc. browser) to upload presets.

The process continues at step 410, where metadata for the preset is received. For example, when uploading a preset, the author can specify information about it such as the author's name, company, effect description and category, the project (e.g., movie, television show, etc.) it was used for and the price (e.g., for sale and/or licensing purposes). At step 415, access control information for the preset is received. The desired amount of security can be selected by the author: the preset can be private (e.g., for the author's sole use), shared with a group such as a company (e.g., a group 310), with multiple friends, or with a specific user group (e.g., a group 320). Additionally or alternatively, the user can specify a hierarchy of access to presets. For example, in an organization implementing the system in a private network, one or more individuals (e.g., studio heads, producers, etc.) may have complete access (e.g., read, write, delete, create, etc.) to all the presets in the organization's preset library. Other individuals (e.g., group leaders) may only have complete access to a subset of the preset library corresponding to those individuals (e.g., to all presets created by individuals in the group), and read access to the remainder of the preset library. Still other individuals (e.g., special effects artists) may have complete access to only presets they create, and read or no access to other presets. Additionally or alternatively, presets can be shared with the general public. These are merely examples of how access to presets may be structured, and those of skill in the art will understand that other techniques may be used. In addition, some parameters (e.g., of the associated plug-in) can be recommended for making appropriate minor adjustments to the current settings.

At step 420, the host application and/or plug-in (or stand-alone application) creates a set of data containing the plug-in's parameters, parameter values, and/or other inputs and values for the inputs, and additional metadata, in a common, extensible format. For example, the application may serialize the preset to a markup language such as Extensible Markup Language (XML). This data and metadata is uploaded to the website where it can be translated into or conformed to a neutral schema, alternatively referred to as a neutral or generic data structure definition, and stored. When the preset is uploaded to the web server 330, a thumbnail image and/or video can also be included that shows an example of what the corresponding effect looks like when applied to the author's video material. The data can be transferred between users and the web server 330 in XML or in another data transfer language, but may be stored in other machine-readable forms in the data store. Additionally or alternatively, other data formats may be used to transfer data to and from the web server 330 and to store data in the data store.

FIG. 5 is an example preset 500 in an XML format. The preset is for a plug-in named "S_LensFlare," as indicated by reference character 505. The preset includes metadata 505 and data 510. The metadata 505 includes information such as information about the associated plug-in and its vendor, information about the host application, and information about the author and a corresponding project. The system may use the metadata 505 for various purposes, such as for attributing an author of the plug-in preset on the web server 330, for pricing the plug-in preset for sale and/or licensing purposes, and/or for compensating the author for others' use of the plug-in preset. The system may also use the metadata 505 for purposes of allowing users to search for plug-in presets. The data 510 includes information such as parameter names and values and data representing a thumbnail image extracted from a frame of video to which the preset may be applied or has been applied.

Returning to FIG. 4, at step 425 the application transfers the XML file to the web server 330. At step 430, the system determines the original schema of the preset. For example, the system can determine the original schema by analyzing metadata (e.g., the metadata 505) included in the XML file. At step 435 the system automatically modifies the preset to translate the preset into or conform the preset to the neutral schema. The neutral schema can be non-specific (not specific to any particular application for generating effects). This translation/conformation is described in more detail with reference to e.g., FIG. 6.

Auto-Translation of Presets/Auto-Modification of Presets to Conform to Different Schemas An application typically requires a preset to be structured according to a certain schema. A schema provides how a preset should be structured in order for the preset to be usable by an application. The schema may define the required parameters and their order, constraints for parameter values, information regarding input requirements, other required data identifiers and associated data values, and/or required metadata. For example, the application may require that the preset include certain parameters and/or that the parameters be ordered in a certain way. As another example, the application may require that preset parameters be named according to a certain convention. As another example, the application may require that parameters use a certain measurement system, that parameter values are within a certain range, and/or that parameter values have a certain type. A schema may be specific to one or more applications (an application-specific schema) or a schema may be non-specific to any applications. The neutral schema described herein is an example of a non-specific schema. A schema may be alternatively referred to as a data structure definition.

Although a preset may be structured according to a certain schema specific to an application, the preset may not be usable by another application that requires presets to be structured according to another schema. For example, a plug-in on one host application may have different parameters and/or different interpretations for parameters than a corresponding plug-in on another host application or stand-alone application. For example, a plug-in on one host application may specify a parameter value from a range of values such as 1-100. The same plug-in on another host application may specify, for the same parameter, a value from a range of values such as 1-10. As another example, a plug-in for one host application may require that certain parameters utilize an x-y coordinate system measured in pixels, whereas the same plug-in for another host application may require that the same parameters utilize an x-y coordinate measured in picas. As another example, a plug-in for one host application may require certain parameters and parameter values that are not required by the same plug-in for another host application.

The system automatically provides for translation of these schema differences such that a preset usable by a first application and conforming to a first schema associated with the first application can be modified to conform to a second schema associated with a second application. The translation allows the preset to become usable by the second application.

In some cases, the system automatically modifies presets structured according to application-specific schemas such that the preset conforms to a common and extensible neutral schema. The system can then automatically modify the preset (after the preset was conformed to the neutral schema) to conform the preset to other application-specific schemas. Among other things, translation across different application schemas allows a plug-in running on any host application to share preset data with a corresponding plug-in on any other host application and/or stand-alone application.

Figure 6:
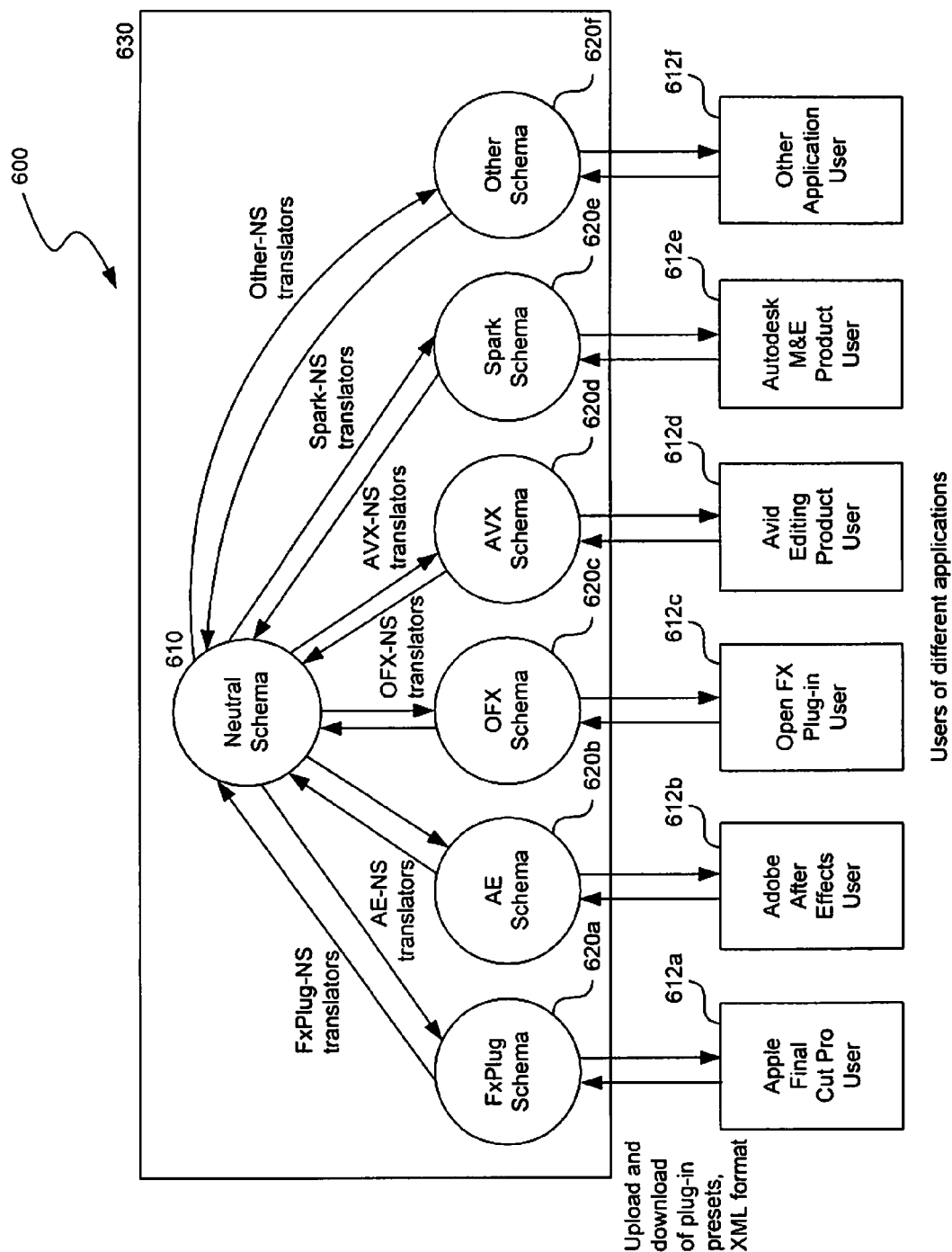
FIG. 6 is a block diagram illustrating translations of presets between application schemas and a neutral schema and vice-versa.

FIG. 6 is a block diagram 600 illustrating translation of or conformation of presets having application-specific schemas to a neutral schema and vice-versa. Users 612 (shown individually as users 612*a-f*) may use plug-ins that utilize presets in different schemas (shown individually as schemas 620*a-f*). For example, user 612*a* utilizes Apple Final Cut Pro, which uses presets having an FXPlug Schema 620*a*. As another example, user 612*b* utilizes Adobe After Effects, which uses presets having an AE Schema 620*b*. As another example, a user 612*f* utilizes another application (e.g., a stand-alone application such as a web application, video game, etc.) which uses presets having a schema 620*f*. (The XML file illustrated in FIG. 5 includes data structured according to a schema that corresponds to an Adobe After Effects plug-in preset.) In order for the Apple Final Cut Pro user 612*f* to share his or her presets with the Adobe After Effects user 612*b* and vice-versa, each's respective presets need to be translated into or conformed to the schema that the other application requires presets to have. Accordingly, in order to share presets between users 612 who utilize different applications, presets saved in one application-specific schema 620 need to be able to be translated into or conformed to other application-specific schemas 620.

This can be done by translating or conforming the application-specific schemas 620 into a Neutral Schema 610. This translation can be performed at the web server 330 or at another computing device 630 (e.g., at the computing devices of the users 612). Once one application-specific schema 620 has been translated into or conformed to the Neutral Schema 610, it can be translated or conformed into any other application-specific schema 620 (or back to the original application-specific schema 420). Among other things, this enables the Apple Final Cut Pro user 612*a* to share its presets with the Adobe After Effects User 612*b*, or with any other user 612.

Translation or conformation of a preset can involve various modifications to the preset. One modification can be that names of parameters should be changed. For example, a preset according to a certain schema may have a parameter name of "width," but another schema may require the parameter to be named "radius." The system would modify the parameter name to conform to the other schema. Another modification can be that parameter values should be changed. For example, a preset according to one application's schema may require that a parameter named "intensity" have values in a range of 1-10 and have an integer data type. Another application's schema may require that the values for the "intensity" parameter be given in percent and have a floating-point data type. The system would modify the parameter value and data type to conform to the other schema.

Another modification can be that parameters should be reordered. For example, an application may expect preset parameters to be in a certain order, and another application may expect preset parameters to be in a different order. The system would modify the preset to reorder the preset parameters to conform to the other schema. Another modification can be that parameters should be added to or removed from a preset according to a first schema to conform the preset to a second schema. The system would add or remove parameters to conform the preset to the second schema. As an alternative or in addition to these examples, the system may make other modifications to a preset to translate the preset into or conform the preset to a schema. Accordingly, modifications to presets are not limited to the modifications given herein.

The system can use various techniques to modify a preset. For example, the system may compare the preset to a schema definition data structure to determine how to modify the preset to conform the preset to the schema. The schema definition data structure can be stored in a data store and loaded from the data store. Additionally or alternatively, the schema definition data structure can be maintained in software components. The system may iterate through preset data and metadata items, compare each data and metadata item to the corresponding definition in the schema definition data structure, and where necessary, modify each data and metadata item to conform the preset to the schema. The system may also add or remove data and metadata items as necessary to conform the preset to the schema. The system may then store the modified preset data and metadata. Those of skill in the art will understand that the system can use other techniques to modify a preset to conform the preset to a schema.

This translation or conformation can be automatically performed when the computing device 630 receives a preset having the application-specific schema 620 from the user 612. Additionally or alternatively, the computing device 630 can receive the preset having the application-specific schema 620 and save it as received. When the preset is requested by another user 612, the computing device 630 can then translate it into or conform it to the Neutral Schema 610, and then into the necessary application-specific schema 620. Alternatively, if a user of the same application requests the preset, the computing device 630 may not need to translate it into or conform it to the Neutral Schema 610, and can simply provide the preset to the user as it was saved. Additionally or alternatively, the users 612 can send the preset data in an application-specific format to the computing device 630. The computing device 630 can then store the preset data, and translate the preset data into or conform it to other application-specific formats as necessary (such as by translating it into or conforming it to a non-application-specific format, and then to another application-specific format, or by translating it or conforming it directly into another application-specific format). The system can also support users of applications and application-specific schemas other than those illustrated in FIG. 6.

In some embodiments, presets are modified in a batch process (e.g., multiple presets are modified to conform to the neutral schema in a batch after the web server 330 receives a certain number of presets or at a scheduled time). In some embodiments, the preset is modified upon demand, e.g., when a request is made for the preset that requires a schema other than the original schema the preset had when it was received. Returning to FIG. 4, the process continues at step 440 where the XML file and the modified preset are stored (e.g., on the database or on a file server). The process 400 then concludes.

Accessing Shared Presets

Users can browse the collection of presets that have been saved by themselves and others. Website capabilities can allow searching for presets based on author, company, project, category, specific plug-in, application, etc. Social networking features can also be provided such as tagging, voting, and discussions of the various presets available, their authors, and typical uses. Presets can be automatically tagged with the specific plug-in name and/or specific application name that was used to create them. The system can also support users' ability to create free-form tags for presets. The system can also use reputation-based tagging and filtering to provide added value to users. Tag auto-completion is another way to encourage uniformity, but the ability to use tags in previously unforeseen ways should be preserved.

Figure 7:
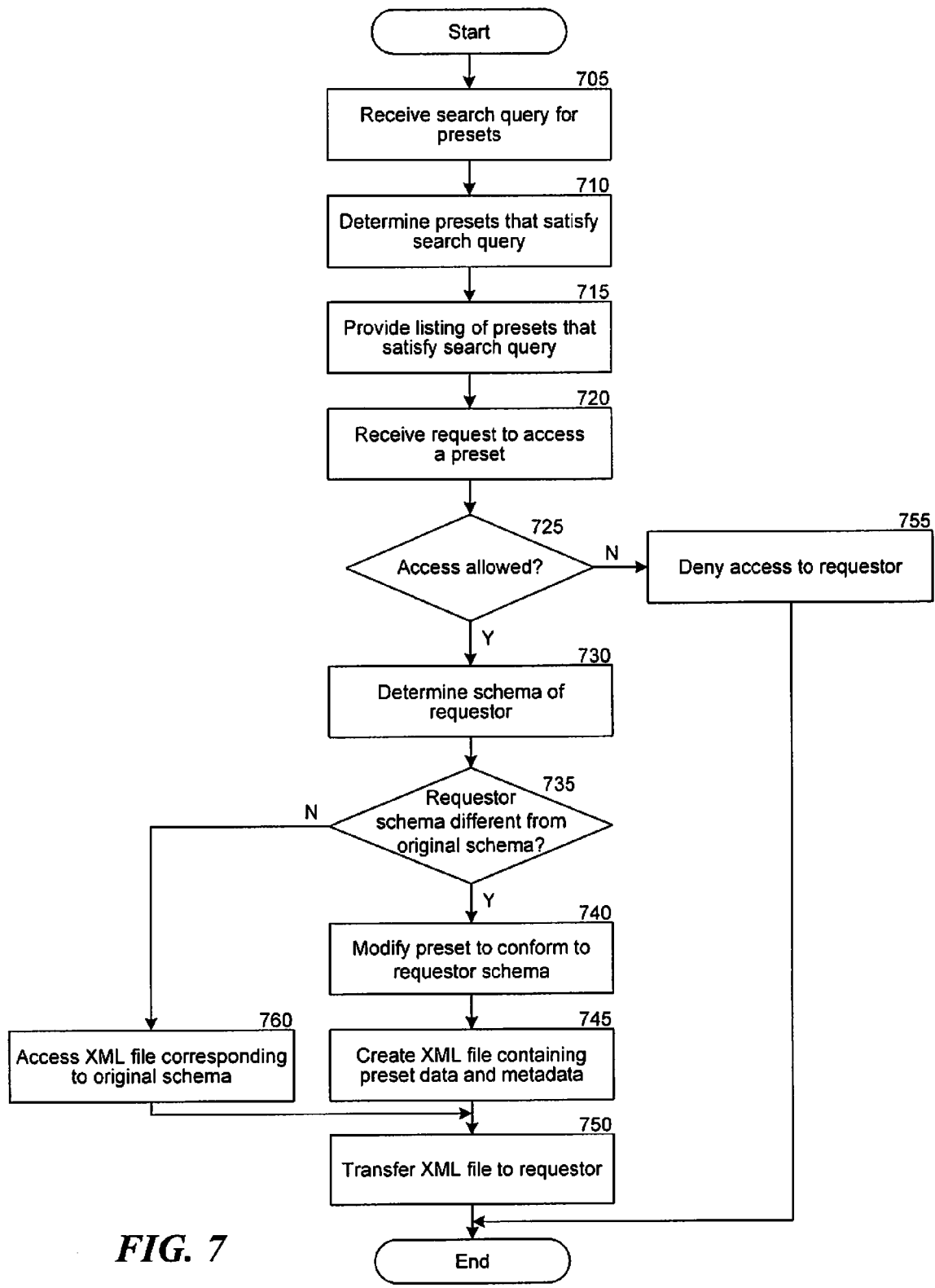
FIG. 7 is a flow diagram illustrating a process for obtaining a shared preset.

FIG. 7 is a flow diagram illustrating a process 700 for obtaining a shared preset from the collection of presets stored in the data store. The process 700 begins at step 705 where the system receives a search query for presets. For example, the user could utilize the plug-in user interface of the host application to browse or search presets based on one or more conditions such as popularity, project, cost, or tags. As another example, the user could utilize a stand-alone browser to search for and access presets. At step 710 the presets that satisfy the search query are determined. At step 715 the system provides a listing of the presets that satisfy the search query to the user. The presets may be viewed with the original thumbnail images or, at the user's choice, with any single frame or clip composed of frames of the user's choice, which could be temporarily uploaded to the server to produce the thumbnails.

At step 720 the system receives a request to access a preset from the user. At step 725 the system determines whether the user is allowed to access the preset. The system may utilize access control mechanisms as described herein to determine if the user is permitted to access the preset. If the user is not permitted to access the preset, at step 755 the system denies the user access to the preset and the process 700 concludes.

If the user is permitted to access the preset, the process 700 continues at step 730, where the system determines the schema required by the requestor. At step 735 the system determines whether the requestor schema is different from the original schema of the preset. This determination may be made in various ways. For example, preset metadata indicating an application (e.g., a plug-in and host application or a stand-alone application) can be compared with an application specified in the request to determine if the requestor schema is different from the original schema. As another example, preset parameter names and/or other inputs can be analyzed to determine if the requestor schema is different from the original schema.

If the requestor schema is different from the original schema, then at step 740 the system modifies the preset to conform the preset to the requester schema. Before modification the preset may have been in the original schema or the neutral schema. At step 745 the system creates an XML file that contains the preset data and metadata structured according to the requestor schema. At step 750 the system transfers the XML file to the requestor.

However, if the requestor schema is identical to the original schema, the system can provide the XML file corresponding to the original schema to the requestor. The XML file corresponding to the original schema can be used based on the assumption that the requestor can utilize the preset data and metadata in the XML file without modification (or with minor modifications). If the requestor schema is identical to the original schema, the process continues at step 760 where the system access the XML file corresponding to the original schema. The process then continues at step 750, where the system transfers the XML file to the requestor. The process 700 then concludes.

The user's application can update the effect plug-in on the user's local machine (or an existing preset and/or application) according to the preset data, and that effect can be applied to the video material the user is currently working on or the video material of the user's choosing. In some embodiments, the plug-in or the application utilizes the XML file natively (e.g., the plug-in or the application de-serializes the XML file to obtain the preset data and metadata). In some embodiments, the plug-in or the application converts the XML file into another data structure or object and loads the data structure into the plug-in or the application.

Hosted Processing of Video Using Shared Presets

Figure 8:
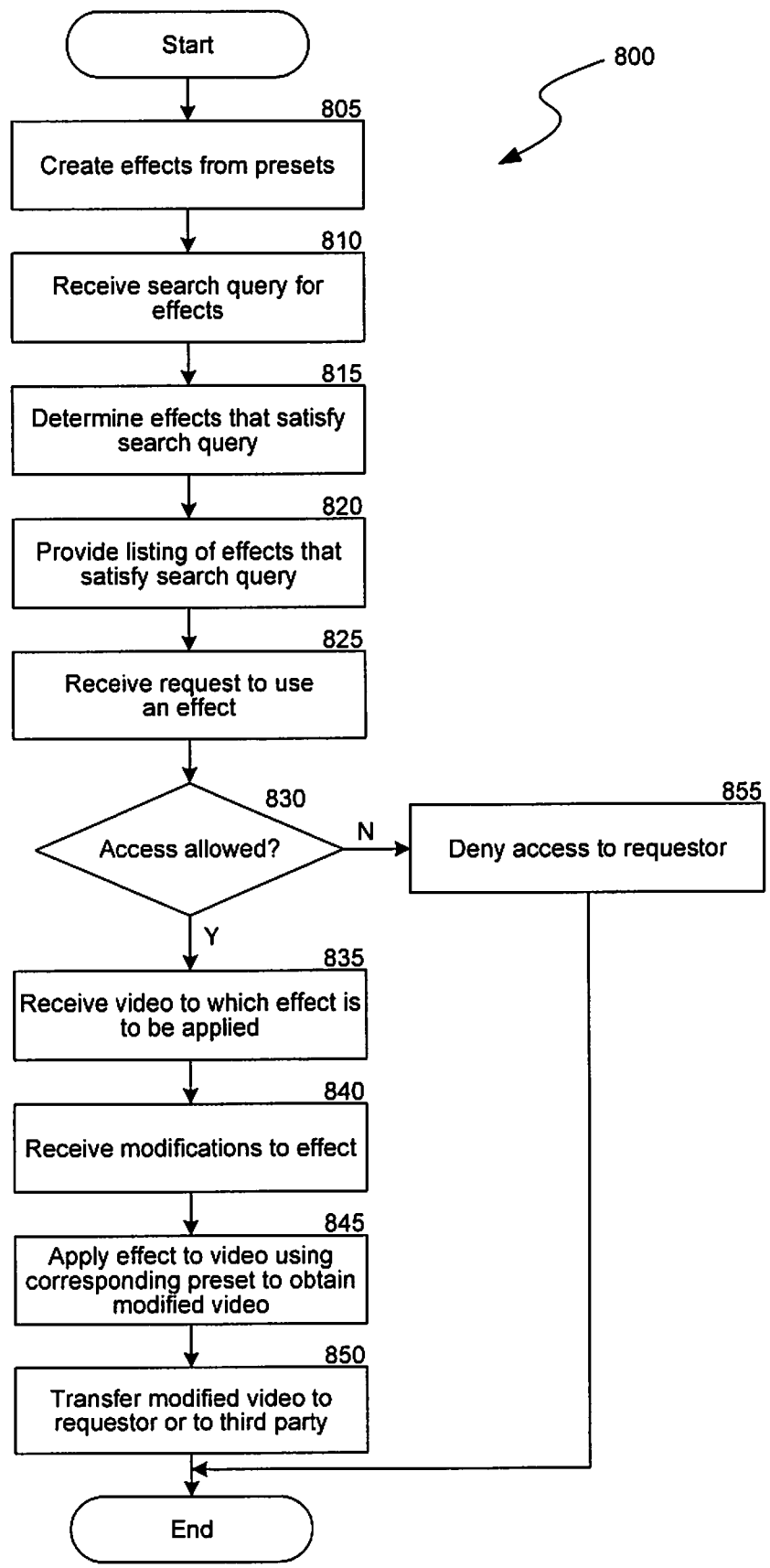
FIG. 8 is a flow diagram illustrating a process for processing video using effects created from shared presets.

As described with reference to, e.g., FIG. 3, presets can be converted into stand-alone effects and used to process uploaded video material. FIG. 8 is a flow diagram illustrating a process 800 for processing video using effects created from shared presets. The process 800 begins at step 805 where the system creates effects from presets that have been shared and are part of the collection of presets in the data store. The system can create effects by applying one or more presets to a sample digital video. In some embodiments, the system applies one or more presets according to their original schemas to the sample digital video. In some embodiments, the system applies one or more presets according to the neutral schema to the sample digital video.

At step 810, the system receives a search query for effects. For example, the user can utilize a stand-alone browser to search for and access effects. At step 815 the system determines the effects that satisfy the search query. At step 820 the system provides a listing of the effects that satisfy the search query to the user. The user can view the effects and select an effect to apply to the user's video.

At step 825 the system receives a request to access an effect from the user. At step 830 the system determines whether the user is allowed to access the effect. Access control mechanisms as described herein may be used to determine if the user is permitted to access the effect. If the user is not permitted to access the preset, at step 855 the user is denied access and the process 800 concludes.

At step 835 the system receives video to which the effect is to be applied. For example, the user can upload video to the web server 330. The user can upload video from their computer, phone camera or from another source such as other websites (e.g., YouTube, Vimeo, Hulu, etc.). At step 840 one or more modifications to the effect are received. For example, in some embodiments, the user can select from a wide range of visual effects to apply to their video and make minor adjustments using parameters specified by the original author (e.g., a professional user 312). The system may allow the user to modify the amount or strength of the effect to be applied, to apply it to only certain elements, regions, or time ranges of the video, or to select among various preselected and/or random variations of the original effect.

At step 840, the system processes the video using one or more effects selected by the user. For example, the system can use its own custom application (e.g., an application that provides functionality similar to that of host applications such as those described herein) that comprises part of the web server 330 to process frames of video using a selected preset and its associated plug-in. The user can then download the processed video. For example, the user can download the result back to his or her local machine, or send it directly to a video hosting website (e.g., YouTube, Vimeo, Hulu, etc.), and/or to other destinations (e.g., Internet-enabled television, video delivered to a set-top box and/or digital video recorder, etc.). In some cases, the system application also provides editing functionality, so that users (e.g., consumer users 322) can edit video and add effects to it using a single web application. In some cases, the web server 330 may provide video hosting services to users so that the processed video is immediately viewable by other users as well as other people browsing the web site.

As an alternative to having the web server 330 process the video, a user can install an application to process effects on their local machine, which may be a computer or any programmable device such as a mobile phone, camera, or video recorder. This could save the user the time of uploading and downloading the video to the web server 330. The user could download specific effects (preset data) to process video on their own machine or device. The application could be a stand-alone application with a different consumer-focused UI (for example, a stand-alone application that may not include a plug-in for a host application).

Additionally or alternatively, a combination of local and hosted rendering could be used. For example, a thumbnail image could be rendered on the machine or device of the user to give faster feedback with low resolution images (e.g., for a device with limited memory or processing speed). Then, once the effect has been set up, a full resolution version could be processed on the web server 330. After step 840, the process 800 then concludes.

Security

Uploads and downloads can be secured with SSL. Security on the server can be done with standard mechanisms. It is also possible to confirm a user's license status during the transaction to prevent misuse of the system or to enable advanced functionality. License status might include a license to use the system itself, a license to use a host application, and/or a license to use plug-ins (for example, Sapphire or other GenArts products), as appropriate.

In order to make a preset available only to selected users or groups, the author can require that a password be entered to access it. Other security techniques known to those of skill in the art may also be used to control access to presets.

Deriving Revenue from Sharing Presets and Effects

For users without access to applications (e.g., consumer users), there are several revenue models. A first model is that the presets could be offered for free in order to help build community and a high traffic site more quickly. A second model is that the presets could be offered for free with advertising either on the site or embedded in the processed video. If the system implementor creates a high traffic site, advertising revenue may help generate revenue without slowing down users by charging them directly. A third model is that the system implementor charges a subscription, tiered by amount of use. The system implementor may still offer a free service up to a certain amount of use, so users can easily get started. After that they could be charged a monthly fee, with different service levels offered, for example for occasional and frequent users.

Additionally or alternatively, access to presets could be structured into tiers based on factors other than use. For example, presets could be tiered or otherwise categorized based upon an assigned value (e.g., asking price). The system implementor could charge users a fee for access to a first tier of presets, another fee for access to the first and second tiers of presets, and another fee for access to all three tiers of presets.

Additionally or alternatively, the system implementor could provide access to presets based upon contribution to the user community. For example, a user that contributes a certain number of presets may be provided with access to presets provided by other users. As another example, a user that provides reviews of presets and/or assists other users in the community may be given access to other user's presets. As another example, a user that provides a highly rated and/or highly ranked preset may be rewarded with access to additional presets. The system implementor may also use other techniques of rewarding users to encourage participation in the user community and thereby provide a rewarding user experience.

For users with host applications and/or stand-alone applications (e.g., professional users), the system implementor can make the collaboration service free when the users purchase or license another product such as an upgrade to a next major released version of a plug-in package (or, for example, when an organization purchases a site license to use a plug-in package, such as a site license to use GenArts' plug-in packages). Alternatively or additionally, users may be compensated for successful effects that they create and contribute, for example with a royalty agreement. For example, if an author creates an effect that becomes widely known and sought after by other users, the author could be compensated for each use of the effect by other users.

The system implementor could also use other pricing models. For example, the system implementor could charge a one time fee for perpetual use for a single effect, (e.g., similar to the pricing model for iTunes songs). The system implementor could charge for each use of individual effects, or per use of collections of effects. Tiered pricing may also be employed: "premium" subscription levels could enable more features and functionality such as high definition resolutions, reduced compression, increased bit depth, faster processing time, dedicated upload/download bandwidth, or other features. Alternatively or additionally, the system may tie download limits to uploads, to encourage sharing. Alternatively or additionally, the system may create a third-party market by allowing people to charge for presets. The system can require a consideration (e.g., money, viewing an advertisement, payment of a licensing fee, a subscription, etc.) from the user in order to allow the user to access a preset.

An option for privately hosted servers may also be employed. A facility could purchase a turn-key version which could enable sharing only within that facility. For example, a special effects studio could use the system to share presets amongst individuals employed by the studio, amongst individuals involved in producing a certain video production (e.g., television show, movie, etc.), or between the individuals associated with multiple production studios.

Additional Services Offered to Users

The system may offer users at least temporary video storage. The system may also offer longer term video storage (e.g., permanent or semi-permanent video storage). The system implementor could also enter into partnerships with other entities that could provide video storage to users. For example the system implementor could partner with video hosting websites (e.g., YouTube, Vimeo, Hulu, etc.), by which the video hosting websites could host the videos and provide links to and from the editing and effects solutions provided by the system.

The system may also offer web-hosted editing functionality so that users can edit and add effects at the same time. Consumers may be able to use just a smart phone or netbook to view, edit and apply effects to their videos.

CONCLUSION

In general, the detailed description of embodiments of aspects of the invention is not intended to be exhaustive or to limit the invention to the precise form disclosed above. While specific embodiments of, and examples for, aspects of the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the invention may be stored or distributed on computer-readable data storage media, including magnetically or optically readable computer discs, hard-wired or preprogrammed chips (e.g., EEPROM semiconductor chips), nanotechnology memory, biological memory, or other computer-readable data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of aspects of the invention reside on a server computer, while corresponding portions reside on a client computer such as a mobile or portable device, and thus, while certain hardware platforms are described herein, aspects of the invention are equally applicable to nodes on a network.

The teachings of aspects of the invention provided herein can be applied to other systems, not necessarily the system described herein. The elements and acts of the various embodiments described herein can be combined to provide further embodiments.

Any patents, applications and other references, including any that may be listed in accompanying filing papers, are incorporated herein by reference. Aspects of the invention can be modified, if necessary, to employ the systems, functions, and concepts of the various references described above to provide yet further embodiments of aspects of the invention.

These and other changes can be made to aspects of the invention in light of the above Detailed Description. While the above description details certain embodiments of aspects of the invention and describes the best mode contemplated, no matter how detailed the above appears in text, aspects of the invention can be practiced in many ways. For example, although sharing of presets has been described in the context of video editing, compositing, motion graphics, and effects generation, the techniques described herein are equally applicable to other types of digital assets, such as digital images, digital sound files, digital animation files, other digital multimedia files, and other types of digital assets or digital content. Accordingly, the techniques described herein may be utilized to modify other types of digital assets, digital content, or human perceptible content (content that a human can perceive which may be in other than digital form but was once in digital form). Various types of computing devices may store presets, and such devices may apply presets to generate effects to digital assets. As an example, a camera may store a preset used to create a glow effect and automatically apply the preset to a captured image to create the glow effect in response recognizing that the captured image includes a face. There may be other uses of the techniques described herein.

Details of aspects of the invention may vary considerably in its implementation details, while still being encompassed by aspects of the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit aspects of the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claim elements intended to be treated under 35 U.S.C. §112, 116 will begin with the words "means for.") Means for storing can include various structural components (e.g., computer-readable storage media) configured to store digital content. Means for conforming can also include various structural components. For example, the means for conforming could include a computer (e.g., a special purpose computer) programmed to perform an algorithm for conforming a preset to a schema or a data structure definition (e.g., perform an algorithm similar to that described with reference to e.g., FIG. 6). Means for modifying could also include a computer (e.g., a special purpose computer) programmed to perform an algorithm for modifying a preset to conform the preset to a schema or a data structure definition. Those of skill in the art will understand that means for may include various structural components described herein. The inventors reserve the right to add additional claims after filing the application to pursue additional claim forms for other aspects of the invention.

We claim:

1. A method of sharing presets usable by applications for generating visual effects for moving or still images, the method comprising:
receiving a preset usable by a first application for generating visual effects,
wherein—
the preset includes first data that conform to a first schema, and
the first schema corresponds to the first application for generating visual effects;
in response to receiving the preset, automatically modifying, by a computing system having a processor and a memory, the first data to obtain second data that conform to a neutral schema, wherein the neutral schema is different from the first schema;
storing the preset in a collection of presets, wherein the collection of presets is accessible to multiple users;
receiving a request for the preset from a user, wherein—
the request indicates a second application for generating visual effects that is different from the first application for generating visual effects,
the second application for generating visual effects uses presets that include data that conform to a second schema,
the second schema corresponds to the second application for generating visual effects, and
the second schema is different from the first and neutral schemas;
modifying, by the computing system, the second data to obtain third data that conform to the second schema, wherein the second schema is different from the neutral schema; and
providing the preset to the user, wherein the preset includes the third data that conforms to the second schema.

2. The method of claim 1 wherein the neutral schema does not correspond to an application for generating visual effects.

3. The method of claim 1, further comprising:
receiving a video;
receiving a request to apply the preset to a portion of the video; and
applying, by the computing system, the preset to the portion of the video to obtain a modified video.

4. The method of claim 1 wherein the first application for generating visual effects or the second application for generating visual effects includes a host application and a plug-in usable in combination with the host application.

5. The method of claim 1 wherein the first application for generating visual effects or the second application for generating visual effects is a stand-alone application for generating visual effects.

6. The method of claim 1, further comprising:
requiring payment from the user in order to allow the user to access the preset; and
receiving the required payment from the user prior to providing the preset to the user.

7. The method of claim 1 wherein the user is a first user, the preset is provided by a second user, and wherein the first and second users are both associated with the same organization.

8. The method of claim 1 wherein the computing system is a first computing system, each of the first and second applications for generating visual effects executes on a respective second computing system, each second computing system having a processor and memory, and wherein the first computing system and the second computing systems are communicably coupled to each other but are not communicably coupled to the Internet.

9. The method of claim 1, further comprising:
receiving a search query for presets from the user, wherein the search query specifies one or more criteria;
identifying presets having associated metadata that satisfy the one or more criteria, the associated metadata including tags or categories provided by users; and
providing an indication of the identified presets to the user, the identified presets including the preset,
such that the user may request the preset.

10. The method of claim 1 wherein the preset includes descriptive metadata.

11. A non-transitory computer-readable storage medium storing instructions that, if executed by a computing system having a processor, cause the computing system to perform operations for sharing presets usable by applications for generating visual effects for moving or still images, the operations comprising:
receiving a preset usable by a first application for generating visual effects, wherein—
the preset includes first data that conform to a first schema, and the first schema corresponds to the first application for generating visual effects;
in response to receiving the preset, automatically modifying the first data to obtain second data that conform to a neutral schema, wherein the neutral schema is different from the first schema;

receiving a request for the preset from a user, wherein—
the request indicates a second application for generating visual effects that is different from the first application for generating visual effects,
the second application for generating visual effects uses presets that include data that conform to a second schema,
the second schema corresponds to the second application for generating visual effects, and
the second schema is different from the first and neutral schemas; and modifying the second data to obtain third data that conform to the second schema.

12. The computer-readable storage medium of claim 11 wherein the neutral schema does not correspond to an application for generating visual effects.

13. The computer-readable storage medium of claim 11, the operations further comprising:
receiving a video;
receiving a request to apply the preset to a portion of the video; and
applying, by the computing system, the preset to the portion of the video to obtain a modified video.

14. The computer-readable storage medium of claim 11 wherein the first application for generating visual effects and the second application for generating visual effects includes a host application and a plug-in usable in combination with the host application.

15. The method of claim 11 wherein the first application for generating visual effects is a stand-alone application for generating visual effects and the second application for generating visual effects is a stand-alone application for generating visual effects.

16. The computer-readable storage medium of claim 11, the operations further comprising:
requiring payment from the user in order to allow the user to access the preset; and
receiving the required payment from the user prior to providing the preset to the user.

17. The computer-readable storage medium of claim 11 wherein the user is a first user, the preset is provided by a second user, and wherein the first and second users are both associated with the same organization.

18. The computer-readable storage medium of claim 11 wherein the computing system is a first computing system, each of the first and second applications for generating visual effects executes on a respective second computing system, each second computing system having a processor and memory, and wherein the first computing system and the second computing systems are communicably coupled to each other but are not communicably coupled to the Internet.

19. The computer-readable storage medium of claim 11, the operations further comprising:
receiving a search query for presets from the user, wherein the search query specifies one or more criteria;
identifying presets having associated metadata that satisfy the one or more criteria, the associated metadata including tags or categories provided by users; and
providing an indication of the identified presets to the user, the identified presets including the preset,
such that the user may request the preset.

20. The computer-readable storage medium of claim 11 wherein the preset includes descriptive metadata.

21. The computer-readable storage medium of claim 11, the operations further comprising:
modifying an attribute of a parameter of the preset;
modifying a value of a parameter of the preset;
reordering data of the preset; and
removing data from the preset.

22. A computing system, having a processor and a memory, for sharing presets usable by applications for generating visual effects for moving or still images, the computing system comprising:
a component configured to receive a preset usable by a first application for generating visual effects, wherein the preset includes first data that conform to a first schema corresponding to the first application for generating visual effects;
a component configured to automatically modify, in response to receiving the preset, the first data to obtain second data that conform to a neutral schema that is different from the first schema;
a component configured to receive a request for the preset from a user, wherein the request indicates a second application for generating visual effects that is different from the first application for generating visual effects, wherein the second application for generating visual effects uses presets that include data that conform to a second schema, wherein the second schema corresponds to the second application for generating visual effects, and wherein the second schema is different from the first and neutral schemas; and
a component configured to modify the second data to obtain third data that conform to the second schema,
wherein at least one of the components comprises computer-executable instructions stored in the memory for execution by the processor.

23. A computing system, having a processor, for sharing presets usable by applications for generating visual effects for moving or still images, the computing system comprising:
means for receiving a preset usable by a first application for generating visual effects, wherein the preset includes first data that conform to a first schema corresponding to the first application for generating visual effects;
means for, in response to receiving the preset, automatically modifying the first data to obtain second data that conform to a neutral schema that is different from the first schema;
means for receiving a request for the preset from a user, wherein the request indicates a second application for generating visual effects that is different from the first application for generating visual effects, wherein the second application for generating visual effects uses presets that include data that conform to a second schema, wherein the second schema corresponds to the second application for generating visual effects, and wherein the second schema is different from the first and neutral schemas; and
means for modifying the second data to obtain third data that conform to the second schema.

24. The computing system of claim 23, further comprising:
means for determining that the preset is not usable by the second application for modifying digital assets; and
means for, in response to the determining, automatically modifying the retrieved preset to obtain a modified preset usable by the second application for modifying digital assets.

25. The computing system of claim 23, further comprising:
means for modifying an attribute of a parameter of the preset;
means for modifying a value of a parameter of the preset;
means for reordering data of the preset; and
means for adding data to the preset.

26. The computing system of claim 23 wherein the neutral schema does not correspond to an application for generating visual effects.

27. The computing system of claim 23, further comprising:
   means for receiving a video;
   means for receiving a request to apply the preset to a portion of the video; and
   means for applying the preset to the portion of the video to obtain a modified video.

28. The computing system of claim 23 wherein the first application for generating visual effects and the second application for generating visual effects includes a host application and a plug-in usable in combination with the host application.

29. The computing system of claim 23, further comprising:
   means for requiring payment from the user in order to allow the user to access the preset; and
   means for receiving the required payment from the user prior to providing the preset to the user.

30. The computing system of claim 23, further comprising:
   means for receiving a search query for presets from the user, wherein the search query specifies one or more criteria;
   means for identifying presets having associated metadata that satisfy the one or more criteria, the associated metadata including tags or categories provided by users; and
   means for providing an indication of the identified presets to the user, the identified presets including the preset.

* * * * *

UNITED STATES PATENT AND TRADEMARK OFFICE
CERTIFICATE OF CORRECTION

| | | |
|---|---|---|
| PATENT NO. | : 8,412,729 B2 | Page 1 of 1 |
| APPLICATION NO. | : 12/765541 | |
| DATED | : April 2, 2013 | |
| INVENTOR(S) | : Karl P. Sims et al. | |

It is certified that error appears in the above-identified patent and that said Letters Patent is hereby corrected as shown below:

On the Title Page, Item (56), under "Other Publications", column 2, line 3, Delete "AmpilTube®" and insert -- AmpliTube® --, therefor.

In the Specification

In column 3, line 28, delete "users to" and insert -- users to create and save presets, but instead only allow them to process video using presets --, therefor.

In column 10, line 17, delete "FXPlug" and insert -- FXPlug --, therefor.

In the Claims

In column 19, line 29, in claim 15, delete "method" and insert -- computer-readable storage medium --, therefor.

Signed and Sealed this
Second Day of July, 2013

Teresa Stanek Rea
*Acting Director of the United States Patent and Trademark Office*